United States Patent
Wang et al.

(10) Patent No.: US 12,351,470 B2
(45) Date of Patent: Jul. 8, 2025

(54) PREPARATION METHOD OF GRAPHENE-WRAPPED COBALT PRUSSIAN BLUE NANOCRYSTAL COMPOSITE MATERIAL AND METHOD OF PREPARING WORKING ELECTRODE USING THE SAME AND APPLICATION THEREOF

(71) Applicant: Tongji University, Shanghai (CN)

(72) Inventors: Ying Wang, Shanghai (CN); Fengting Li, Shanghai (CN); Bincheng Xu, Shanghai (CN)

(73) Assignee: Tongji University, Shanghai (CN)

( * ) Notice: Subject to any disclaimer, the term of this patent is extended or adjusted under 35 U.S.C. 154(b) by 963 days.

(21) Appl. No.: 17/475,171

(22) Filed: Sep. 14, 2021

(65) Prior Publication Data
US 2022/0219998 A1 Jul. 14, 2022

(30) Foreign Application Priority Data
Jan. 12, 2021 (CN) .......................... 202110033591.2

(51) Int. Cl.
| | |
|---|---|
| *B32B 9/00* | (2006.01) |
| *C01B 32/198* | (2017.01) |
| *C01C 3/12* | (2006.01) |
| *C02F 1/461* | (2023.01) |
| *C02F 1/467* | (2023.01) |
| *B82Y 30/00* | (2011.01) |
| *C02F 101/16* | (2006.01) |

(52) U.S. Cl.
CPC .............. *C01C 3/12* (2013.01); *C01B 32/198* (2017.08); *C02F 1/46109* (2013.01); *C02F 1/4676* (2013.01); *B82Y 30/00* (2013.01); *C01P 2004/64* (2013.01); *C02F 2001/46138* (2013.01); *C02F 2101/163* (2013.01)

(58) Field of Classification Search
CPC ....... Y10T 428/30; B82Y 30/00; B82Y 40/00; C01B 32/198; C02F 2001/46138
USPC ......................................................... 428/408
See application file for complete search history.

(56) References Cited

FOREIGN PATENT DOCUMENTS

| CN | 104698042 A | * | 6/2015 |
|---|---|---|---|
| CN | 106966459 A | * | 7/2017 |
| CN | 110504429 A | * | 11/2019 |

* cited by examiner

*Primary Examiner* — Daniel H Miller
(74) *Attorney, Agent, or Firm* — Troutman Pepper Locke LLP; Tim Tingkang Xia, Esq.

(57) ABSTRACT

The present invention provides a method of preparing a graphene-wrapped cobalt Prussian blue nano-crystalline composite material, and a method of preparing a working electrode using the same and an application thereof. The preparation method of the composite material includes: dispersing a ligand solution containing cobalt and a graphene oxide solution in an aqueous solution fully by stirring and ultrasonication, next, adding a cobalt metal salt solution and fully stirring, and then calcining the mixture in an inert atmosphere after centrifugation and lyophilization to obtain the above composite material. The preparation method of the present invention is simple in operation, low in energy consumption and low in material costs and the like. The composite material is obtained by uniformly and closely wrapping cobalt Prussian blue nano-crystals in graphene with excellent conductivity, thereby significantly improving electron transfer efficiency and active site utilization rate of the composite material.

14 Claims, 3 Drawing Sheets

PREPARATION METHOD OF GRAPHENE-WRAPPED COBALT PRUSSIAN BLUE NANOCRYSTAL COMPOSITE MATERIAL AND METHOD OF PREPARING WORKING ELECTRODE USING THE SAME AND APPLICATION THEREOF

CROSS-REFERENCE TO RELATED APPLICATION

This application claims priority from the Chinese patent application 2021100335912 filed Jan. 12, 2021, the content of which is incorporated herein in the entirety by reference.

TECHNICAL FIELD

The present invention relates to the field of water treatment technologies, and particularly to a preparation method of a graphene-wrapped cobalt Prussian blue nanocrystal composite material and a method of preparing a working electrode using the graphene-wrapped cobalt Prussian blue nanocrystal composite material and an application of the prepared working electrode in electrocatalytic reduction of nitrate in wastewater.

BACKGROUND

Due to the wide application of fertilizers and agricultural chemicals and the massive discharge of industrial wastewater and urban sewage, water environments have been polluted by nitrate in different degrees. Nitrate pollution in underground drinking water sources of many regions in China is severe as nitrate concentration in many of the underground water sources is 100 mg/L (by nitrogen) or greater. Excessive ingestion of nitrate in human bodies may cause conditions such as, but not limited to, methemoglobinemia and asphyxia, and in many circumstances may be lethal. Furthermore, nitrate may be converted to carcinogenic, teratogenic, and mutagenic nitrosamine Therefore, the nitrate concentration in drinking water has been regulated in many countries. Standards for Drinking Water Quality (GB5749-2006) in China stipulates that the maximum permissible nitrate concentration in drinking water is 10 mg/L (by nitrogen).

Recently, various remediation methods including physical, biological, and chemical technologies have been employed for nitrate removal from water. Physical technologies including adsorption, ion exchange, and reverse osmosis do not fundamentally remove nitrate but only transfer or concentrate nitrate in water. Biological technologies reduce nitrate to dinitrogen ($N_2$) via denitrification of microorganisms. However, heterotrophic denitrifying microorganisms typically use organic matter as a nutrition source and thus produce biological sludge, limiting its use drinking water treatment. Chemical technologies include metal catalytic, hydrogen catalytic, and electrochemical reduction. Metal catalytic technology reduces nitrate to $N_2$ by a metal element (e.g., iron, aluminum and zinc and the like) under strict reaction conditions, and usually results in secondary pollution. Hydrogen catalytic technology reduces nitrate to $N_2$ over a catalyst (i.e., palladium-based catalyst, platinum-based catalyst, or the like) with hydrogen as a reductant. However, hydrogen is not only difficult to transport and store due to its flammable and explosive property, but also has low dissolvability in water, which limits its application in water treatment. Electrochemical technology uses electrons as a reductant and does not require additional chemical agents, thus avoiding secondary pollution. Furthermore, owing to its simple process, easy operation, and applicability in distributed water treatment facilities, electrochemical technology shows great promise in drinking water treatment.

Typically, the electrochemical nitrate reduction involves electron transfer on cathode surface (direct reduction) and atomic hydrogen (H*)-mediated process (indirect reduction). Besides, a series of intermediates including nitrite and ammonia are generated. Nitrite may cause degradation and loss of the oxygen-carrying function of blood, leading to methemoglobinemia. Furthermore, nitrite may interact with a secondary amine to form a carcinogen nitrosamine. Ammonia is also a water pollutant. The Sanitary Standards for Drinking Water (GB5749-2006) in China stipulates that the maximum permissible concentrations for nitrite and ammonia are 1 mg/L and 0.5 mg/L (by nitrogen), respectively. Therefore, there is a need to develop an electrocatalyst with high $N_2$ selectivity. There are two methods to achieve high $N_2$ selectivity: (1) nitrate is directly reduced to $N_2$ on a cathode, and (2) nitrate is first reduced to ammonia which is then oxidized to $N_2$ by hypochlorite generated on an anode. Method (2) requires a sufficient concentration of chlorine ions in the solution. Nowadays, noble metals like copper and palladium-based catalysts, as well as zero-valent iron-based catalysts have been widely employed. However, the former requires high cost and easily causes secondary pollution, while the latter requires long reaction time and exhibits poor stability. At the same time, the vast majority of present electrocatalysts require chlorine ions no less than 0.02 mol/L to achieve high $N_2$ selectivity.

Therefore, it is urgent to develop an electrocatalyst with simple preparation, low cost, fast reaction rate, high $N_2$ selectivity and good stability and a method of performing electrocatalytic reduction for nitrate in wastewater using the catalyst.

SUMMARY

In order to overcome the shortcomings including complex preparation, high cost, severe secondary pollution, slow reaction rate, poor $N_2$ selectivity, etc. of conventional electrocatalysts, the present invention provides a preparation method of a graphene-wrapped cobalt Prussian blue nanocrystal composite material. In the preparation method of the composite material, cobalt Prussian blue nanocrystals are firstly grown on a graphene oxide sheet, and then the graphene-wrapped cobalt Prussian blue nanocrystal composite material is obtained through calcination in an inert atmosphere. Additionally, methods are provided for preparing a working electrode using the graphene-wrapped cobalt Prussian blue nanocrystal composite material and applying the prepared working electrode to electrocatalytic nitrate reduction in wastewater. The application of the working electrode, which is prepared to use the graphene-wrapped cobalt Prussian blue nanocrystal composite material, to perform electrocatalytic reduction of nitrate in wastewater features advantages such as a fast reduction rate, high $N_2$ selectivity and good stability.

The present invention provides the following technical solution: a preparation method of a graphene-wrapped cobalt Prussian blue nanocrystal composite material, including the following steps:

(1) adding a ligand solution of 0.1-2 mol/L to a 0.1-10 g/L graphene oxide solution, stirring the mixed solution for 10-60 min, and treating the mixed solution ultrasonically for 5-30 min to obtain a mixture of a ligand and graphene oxide;

(2) adding a metal salt solution of 0.1-2 mol/L to the mixture obtained at step (1), and stirring for 12-36 h to obtain a mixture of graphene oxide and cobalt Prussian blue;

(3) centrifuging the mixture obtained at step (2) at 10000-20000 rpm for 10-30 min to obtain a solid, and lyophilizing the solid obtained by centrifugation for 24-48 h to obtain a graphene oxide supported cobalt Prussian blue nanocrystal composite;

(4) calcining the graphene oxide supported cobalt Prussian blue nanocrystal composite obtained at step (3) in an inert atmosphere to obtain the graphene-wrapped cobalt Prussian blue nanocrystal composite material.

Further, in step (1), the ligand in the ligand solution is one or more of potassium hexacyanocobaltate and trisodium hexacyanocobaltate.

Further, in step (2), a metal salt in the metal salt solution is one or more of cobalt chloride, cobalt nitrate, and cobalt sulfate.

Further, in step (2), a calcination temperature is 100-500° C. and a calcination time is 1-5 h.

Further, the inert atmosphere adopted in step (4) is argon, nitrogen, or a mixture of argon and nitrogen.

The present invention further provides a method of preparing a working electrode using the graphene-wrapped cobalt Prussian blue nanocrystal composite material prepared by the above preparation method, including the following steps:

preparing the working electrode by coating the graphene-wrapped cobalt Prussian blue nanocrystal composite material, carbon black, and N-Methyl pyrrolidone solution of polyvinylidene fluoride onto a nickel foam of length 1-2 cm and width 1-4 cm at a mass volume ratio of 5-10 mg:0.5-1 mg:50-100 μL.

Further, a concentration of the N-Methyl pyrrolidone solution of polyvinylidene fluoride is 10 g/L, and the N-Methyl pyrrolidone solution of polyvinylidene fluoride is prepared by dissolving polyvinylidene fluoride in N-Methyl pyrrolidone.

The present invention further provides an application of the working electrode prepared using the above working electrode preparation method in electrocatalytic nitrate reduction in wastewater, in which a three-electrode system is formed using the working electrode prepared using the graphene-wrapped cobalt Prussian blue nanocrystal composite material, platinum as counter electrode, and Ag/AgCl as reference electrode; the three-electrode system is placed in a wastewater containing nitrate and sodium sulfate electrolyte of 0.05-0.1 mol/L to perform electrocatalytic nitrate reduction.

Further, nitrate concentration in the in the wastewater is 50-500 mg/L (by nitrogen).

Further, working conditions of the three-electrode system are: an initial pH is 3-11, an applied potential of the working electrode is −0.9-1.5 V, and a time of electrocatalysis is 12-48 h.

The graphene-wrapped cobalt Prussian blue nanocrystal composite material prepared in the present invention is abbreviated as Co PBA-rGO.

The present invention has the following beneficial effects.

Compared with the prior art, the present invention has the following advantages.

(1) in the method of preparing the graphene-wrapped cobalt Prussian blue nanocrystal composite material in the present invention, cobalt Prussian blue nanocrystals are adsorbed on the graphene oxide sheet via electrostatic interaction and chelation effects between metal ions and the graphene oxide, and subsequently, cobalt Prussian blue nanocrystals are tightly wrapped in graphene via thermal reduction. Excellent conductivity of graphene and uniform distribution of cobalt Prussian blue nanocrystals facilitate electron transfer and active site utilization of the composite material. At the same time, the tight wrapping of graphene and the strong chemical interaction between graphene and cobalt Prussian blue nanocrystals help to improve the stability of the composite material.

(2) the method of preparing the graphene-wrapped cobalt Prussian blue nanocrystal composite material in the present invention utilizes inexpensive and easily available materials, is simple to operate, and has low energy consumption during the preparation process.

(3) the three-electrode system formed by using the working electrode prepared using the graphene-wrapped cobalt Prussian blue nanocrystal composite material, platinum electrode, and Ag/AgCl is applied to treating nitrate-contaminated wastewater. Compared with existing electrocatalytic nitrate reduction methods, the working electrode prepared in the present invention contains the synthesized graphene-wrapped cobalt Prussian blue nanocrystal composite material so that the electrocatalytic nitrate reduction by the working electrode features a fast reaction rate, high $N_2$ selectivity (reaching 98.97% without additional chlorine supply), and good stability, and thus show great promise intreating nitrate-contaminated wastewater.

BRIEF DESCRIPTIONS OF THE DRAWINGS

The present invention will be detailed below in combination with specific embodiments and accompanying drawings.

DETAILED DESCRIPTIONS OF EMBODIMENTS

The technical solution of the embodiments of the present invention will be clearly and fully described below in combination with the accompanying drawings of the embodiments of the present invention. Apparently, the embodiments described herein are merely some of the embodiments of the present invention rather than all embodiments. All other embodiments obtained by those skilled in the art based on the embodiments of the present invention without paying creative work shall fall within the scope of protection of the present invention.

Embodiment 1

Figure 1:
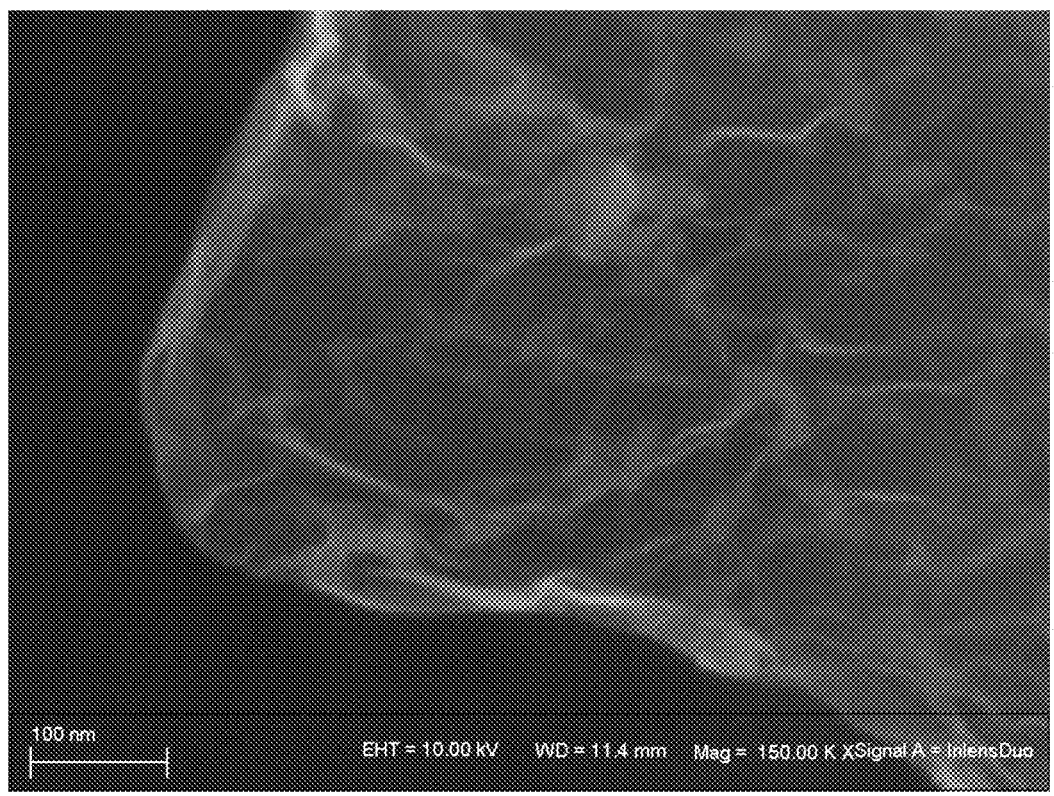
FIG. 1 is a scanning electron microscope image of a synthesized Co PBA-rGO according to a first embodiment of the present invention.
Figure 2:
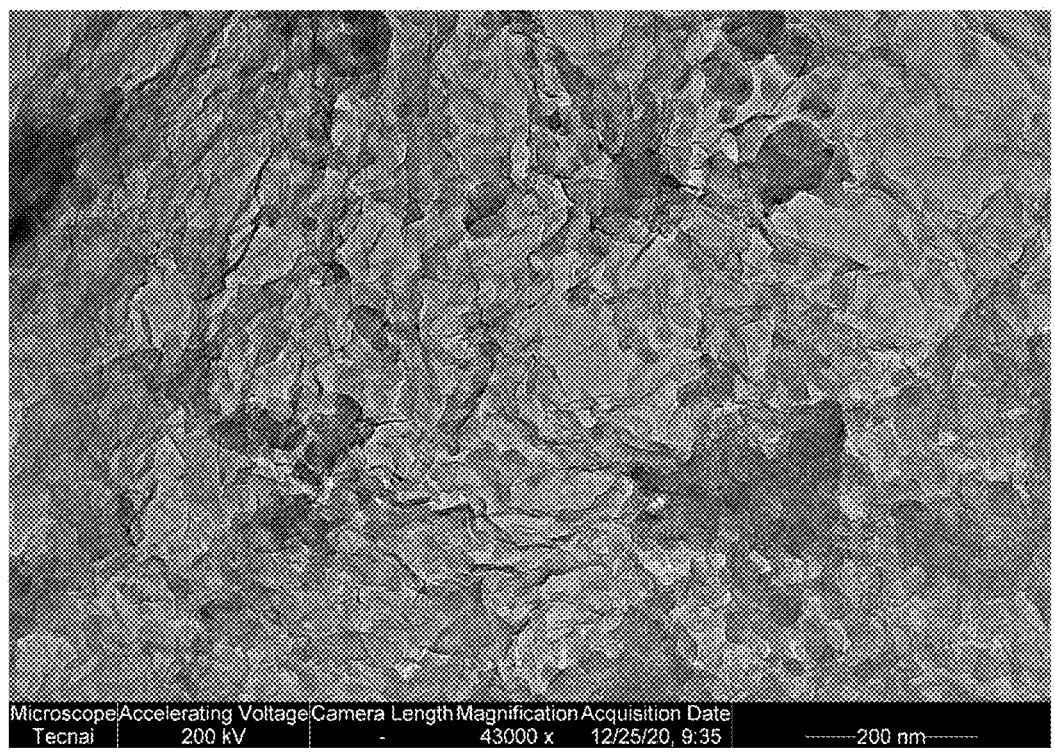
FIG. 2 is a transmission electron microscope image of a synthesized Co PBA-rGO according to a first embodiment of the present invention.
Figure 3:
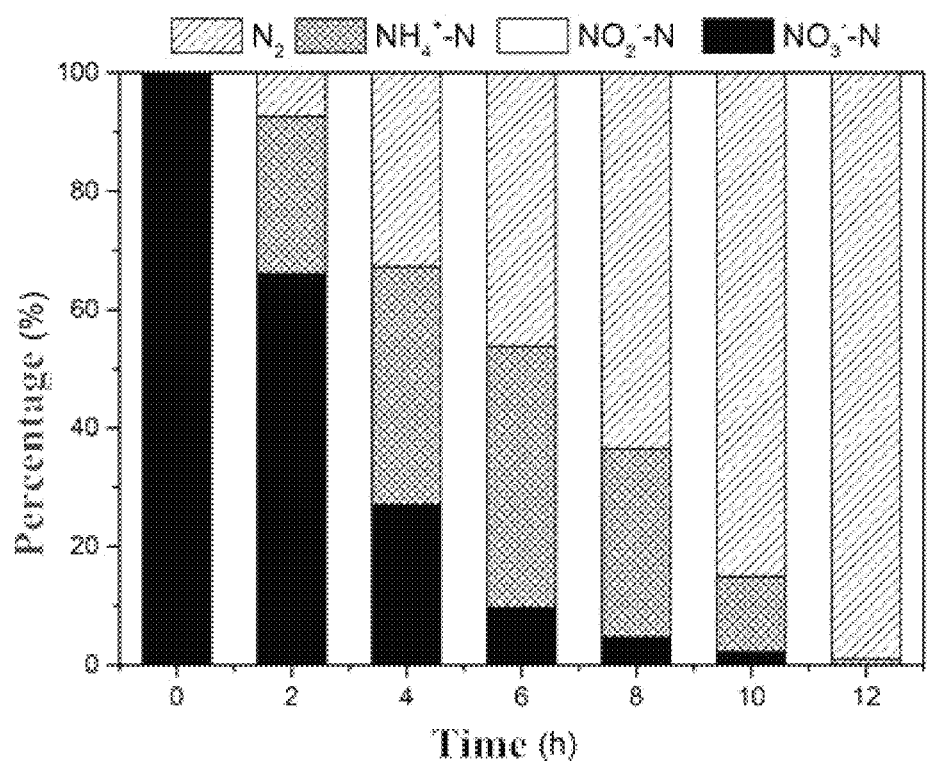
FIG. 3 is a reduction performance diagram of Co PBA-rGO according to the first embodiment of present invention.
Figure 4:
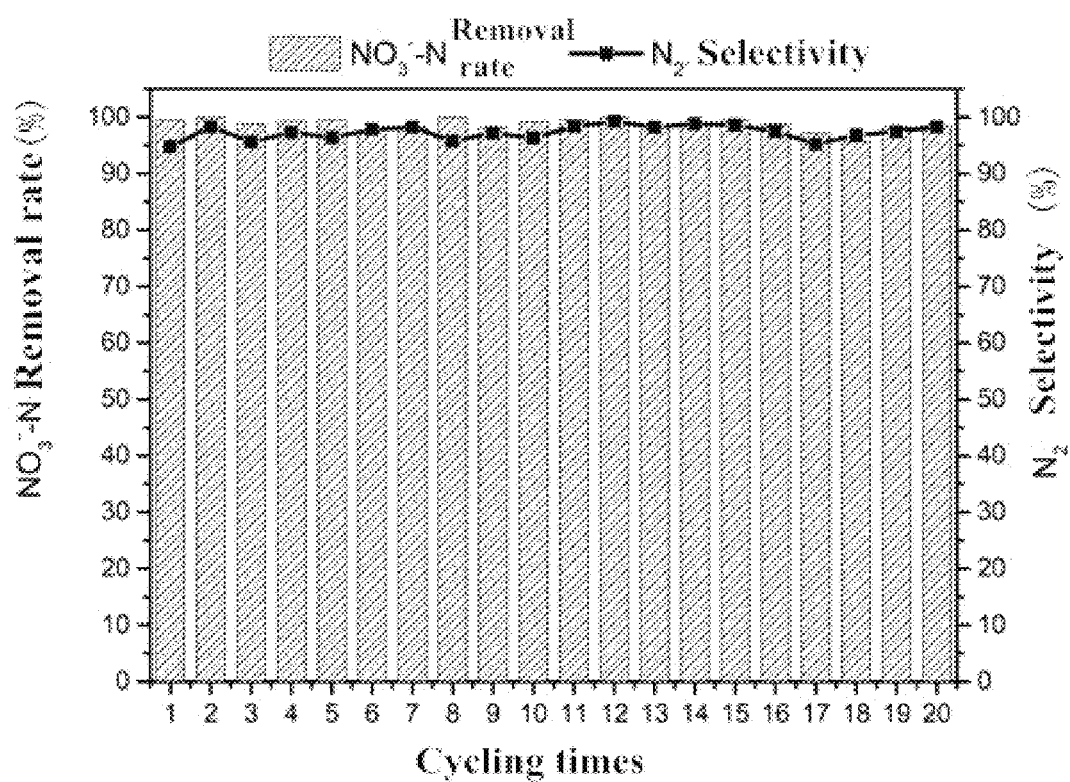
FIG. 4 is an electrocatalytic stability diagram of Co PBA-rGO according to the first embodiment of present invention.

Embodiment 1 provides a method of preparing a graphene-wrapped cobalt Prussian blue nanocrystal composite material (Co PBA-rGO), including the following steps:

0.5 mL of a 0.2 mol/L potassium hexacyanocobaltate solution is added to 100 mL of a 1 g/L graphene oxide dispersion, stirred for 10 min, and treated ultrasonically for 5 min. Next, 5 mL of a 0.5 mol/L cobalt chloride solution is added to the mixture and the mixture is stirred for 12 h and centrifuged for 10 min at 10000 rpm to obtain a solid. The obtained solid is lyophilized for 24 h and calcined for 2 h at 350° C. in argon to obtain a graphene-wrapped cobalt Prussian blue nanocrystal composite material (Co PBA-rGO). FIG. 1 and FIG. 2 show a scanning electron microscope diagram and a transmission electron microscope diagram of the composite material (Co PBA-rGO) synthesized in embodiment 1, respectively. As shown, cobalt Prussian blue nanocrystals are uniformly wrapped in graphene. A working electrode is prepared by coating Co PBA-rGO, carbon black and an N-Methyl pyrrolidone solution of 10 g/L polyvinylidene fluoride (prepared by dissolving polyvinylidene fluoride in N-Methyl pyrrolidone) onto a nickel foam (1×1 cm) at a mass volume ratio of 5 mg:0.5 mg:50 µL, and a three-electrode system is formed using the working electrode, platinum as counter electrode, and Ag/AgCl as reference electrode. The three-electrode system is placed in a nitrate solution to perform electrocatalytic nitrate reduction. The nitrate concentration is 50 mg/L (by nitrogen), an electrolyte is a sodium sulfate solution of 0.1 mol/L, an initial pH is 6, the applied potential is −1.3 V, and a time of electrocatalysis is 12 h. The electrocatalytic reduction performance and cyclic stability of the present embodiment are shown in FIGS. 3 and 4 respectively. It can be seen from FIG. 3 that the nitrate removal rate is 100%, the $N_2$ selectivity is 98.97%, and no nitrite is detected (<0.02 mg/L by nitrogen).

Embodiment 2

A method of preparing a graphene-wrapped cobalt Prussian blue nanocrystal composite material and an application thereof provided in this embodiment is similar to embodiment 1 except that a volume of the potassium hexacyanocobaltate solution is 0.25 mL, and a volume of the cobalt chloride solution is 2.5 mL. The nitrate removal rate is 91.82%, the $N_2$ selectivity is 63.43% and no nitrite is detected (<0.02 mg/L by nitrogen).

Embodiment 3

A method of preparing a graphene-wrapped cobalt Prussian blue nanocrystal composite material and an application thereof provided in this embodiment is similar to embodiment 1 except that a volume of the potassium hexacyanocobaltate solution is 0.75 mL, and a volume of the cobalt chloride solution is 7.5 mL. The nitrate removal rate is 90.60%, the $N_2$ selectivity is 96.84% and no nitrite is detected (<0.02 mg/L by nitrogen).

Embodiment 4

A method of preparing a graphene-wrapped cobalt Prussian blue nanocrystal composite material and an application thereof provided in this embodiment is similar to embodiment 1 except that the calcination temperature is 250° C. The nitrate removal rate is 42.73%, the $N_2$ selectivity is 5.64% and no nitrite was detected (<0.02 mg/L by nitrogen).

Embodiment 5

A method of preparing a graphene-wrapped cobalt Prussian blue nanocrystal composite material and an application thereof provided in this embodiment is similar to embodiment 1 except that the calcination temperature is 450° C. The nitrate removal rate is 56.48%, the $N_2$ selectivity is 35.52% and no nitrite was detected (<0.02 mg/L by nitrogen).

In the method of preparing a graphene-wrapped cobalt Prussian blue nanocrystal composite material according to the present invention, the type of the ligand, the type of the metal salt, the concentration of the ligand solution, the concentration of the graphene oxide solution, the concentration of the metal salt, the stirring time and ultrasonication time at step (1), the stirring time of step (2), the centrifugation speed and time, the lyophilization time of step (3), the temperature and time of calcination, the type of the inert atmosphere, the weight of the graphene-wrapped cobalt Prussian blue nanocrystal composite material used for preparing the working electrode, the weight of carbon black, the volume of the N-Methyl pyrrolidone solution of polyvinylidene fluoride, the length and the width of the nickel foam, the pH value, the applied potential, the catalysis time in a case of application to electrocatalytic nitrate reduction in wastewater, and the concentration of the electrolyte may be selected according to a desired nitrate removal performance in wastewater treatment within a range defined by the present invention.

The above embodiments are used only to describe the technical solution of the present invention rather than limit the present invention. Although the present invention is detailed by referring to the preceding embodiments, those skilled in the art should understand that they still can make modifications to the technical solutions recorded in the above embodiments or make equivalent substitutions to all or part of technical features therein. These modifications and substitutions will not cause the essence of the corresponding technical solutions to depart from the scope of the technical solutions of the embodiments of the present invention.

Furthermore, those skilled in the art should understand that although some embodiments herein include some features included in the other embodiments rather than other features, the combinations of the features of different embodiments are meant to be within the scope of the present invention and form different embodiments. For example, any one of the embodiments claimed by the above claims may be used in any combination. The information disclosed in the background part is merely used to deepen the understanding for the entire background arts of the present invention and shall not be thought as acknowledging or implying in any form that the information constitutes the prior art well-known to the persons skilled in the art.

What is claimed is:

1. A preparation method of a graphene-wrapped cobalt Prussian blue nano-crystalline composite material, comprising the following steps:
   (1) adding a ligand solution of 0.1 mol/L-2 mol/L to a graphene oxide solution of 0.1 g/L-10 g/L, stirring the mixed solution for 10 min-60 min and treating the mixed solution ultrasonically for 5 min-30 min to obtain a mixture of a ligand and graphene oxide;
   (2) adding a metal salt solution of 0.1 mol/L-2 mol/L to the mixture obtained at step (1), and stirring for 12 h-36 h to obtain a mixture of graphene oxide and cobalt Prussian blue;
   (3) centrifuging the mixture obtained at step (2) at a velocity of 10000 rpm-20000 rpm for 10 min-30 min to obtain a solid, and lyophilizing the solid obtained by centrifugation for 24 h-48 h to obtain a graphene oxide supported cobalt Prussian blue nano-crystalline composite;

(4) calcining the graphene oxide supported cobalt Prussian blue nano-crystalline composite obtained at step (3) in an inert atmosphere to obtain the graphene-wrapped cobalt Prussian blue nano-crystalline composite material;

wherein in step (4), a calcination temperature is between about 250° C.-350° C. and a calcination time is between about 1 h-5 h.

2. The preparation method of a graphene-wrapped cobalt Prussian blue nano-crystalline composite material according to claim 1, wherein in step (1), the ligand in the ligand solution is one or more of potassium hexacyanocobaltate and trisodium hexacyanocobaltate.

3. The preparation method of a graphene-wrapped cobalt Prussian blue nano-crystalline composite material according to claim 1, wherein in step (2), a metal salt in the metal salt solution is one or more of cobalt chloride, cobalt nitrate, and cobalt sulfate.

4. The preparation method of a graphene-wrapped cobalt Prussian blue nano-crystalline composite material according to claim 1, wherein in step (4), a calcination temperature is about 350° C. and a calcination time is about 2 h.

5. The preparation method of a graphene-wrapped cobalt Prussian blue nano-crystalline composite material according to claim 1, wherein the inert atmosphere adopted in step (4) is argon, nitrogen, or a mixture of argon and nitrogen.

6. A method of preparing a working electrode using the graphene-wrapped cobalt Prussian blue nano-crystalline composite material prepared using the method according to claim 1, comprising the following step:

preparing the working electrode by coating the graphene-wrapped cobalt Prussian blue nano-crystalline composite material, carbon black and an N-Methyl pyrrolidone solution of polyvinylidene fluoride onto a nickel foam of length 1 cm-2 cm and width 1 cm-4 cm at a mass volume ratio of 5 mg-10 mg:0.5 mg-1 mg:50 µL-100 µL.

7. The method of preparing a working electrode using the graphene-wrapped cobalt Prussian blue nano-crystalline composite material according to claim 6, wherein a concentration of the N-Methyl pyrrolidone solution of polyvinylidene fluoride is 10 g/L, and the N-Methyl pyrrolidone solution of polyvinylidene fluoride is prepared by dissolving polyvinylidene fluoride in N-Methyl pyrrolidone.

8. An application of the working electrode prepared by the method of preparing a working electrode according to claim 6 in electrocatalytic reduction treatment of nitrate nitrogen in wastewater, wherein a three-electrode system is formed using the working electrode prepared using the graphene-wrapped cobalt Prussian blue nano-crystalline composite material, a platinum electrode as a counter electrode, and a silver chloride electrode as a reference electrode; the three-electrode system is placed in a wastewater containing nitrate nitrogen and sodium sulfate electrolyte of 0.05 mol/L-0.1 mol/L to perform electrocatalytic reduction for nitrate nitrogen.

9. The application of the working electrode in electrocatalytic reduction treatment of nitrate nitrogen in wastewater according to claim 8, wherein a concentration of the nitrate nitrogen in the wastewater is, by nitrogen, 50 mg/L-500 mg/L.

10. The application of the working electrode in electrocatalytic reduction treatment of nitrate nitrogen in wastewater according to claim 8, wherein working conditions of the three-electrode system are: an initial pH is 3-11, a voltage of the working electrode is −0.9 V-1.5 V, and a time of electrocatalysis is 12 h-48 h.

11. The method of claim 6, wherein in step (1), the ligand in the ligand solution is one or more of potassium hexacyanocobaltate and trisodium hexacyanocobaltate.

12. The method of claim 6, wherein in step (2), a metal salt in the metal salt solution is one or more of cobalt chloride, cobalt nitrate, and cobalt sulfate.

13. The method of claim 6 wherein in step (4), a calcination temperature is 250° C.-350° C. and a calcination time is 1 h-5 h.

14. The method of claim 6, wherein the inert atmosphere adopted in step (4) is argon, nitrogen, or a mixture of argon and nitrogen.

* * * * *